March 13, 1956 A. D. GILCHRIST 2,738,457
ELECTRICAL GENERATING SYSTEM
Filed Aug. 14, 1953 3 Sheets-Sheet 1

INVENTOR.
ALBERT D. GILCHRIST
BY Hudson Boughton,
Williams, David & Hoffmann
ATTORNEYS March 13, 1956 A. D. GILCHRIST 2,738,457
ELECTRICAL GENERATING SYSTEM
Filed Aug. 14, 1953 3 Sheets-Sheet 3

INVENTOR.
ALBERT D. GILCHRIST
BY Hudson, Doughton,
Williams, David & Hoffmann
ATTORNEYS

United States Patent Office 2,738,457
Patented Mar. 13, 1956

2,738,457

ELECTRICAL GENERATING SYSTEM

Albert D. Gilchrist, Lyndhurst, Ohio, assignor to The Leece-Neville Company, Cleveland, Ohio, a corporation of Ohio Application August 14, 1953, Serial No. 374,190

2 Claims. (Cl. 322—28)

This invention relates to electrical generating systems and, more particularly, to novel regulating means effective to automatically maintain the terminal voltage of the generator substantially constant and to automatically control or limit the load current being delivered to a desired predetermined value. This novel regulating means is especially applicable to vehicle electrical systems in which the generator is driven at variable speeds and, accordingly, is hereinafter described as embodied in such a vehicle electrical system, but without any intention of limiting the invention solely to that specific use.

An object of the invention is to provide novel regulating means for an electric generator in which the field of the generator includes a magnetically opposed or bucking winding, and in which current flow control means of the regulating means is responsive to an operating condition of the generator and controls the field current such that the bucking winding is energized in accordance with the voltage drop across such current flow control means.

Another object is to provide generating system control means in which the regulating means comprises a voltage regulator having vibratory contacts and a resistance in the field circuit in shunt relation to such contacts, and preferably, also comprises a current regulator or limiter having vibratory contacts and a resistance in the field circuit in shunt relation to the current regulator contacts, and in which the bucking field winding is adapted to be energized in accordance with the operating condition and requirements of the generator by being connected across the voltage regulator contacts.

A further object is to provide generating system control means of the character mentioned above in which the current flow control means of the regulating means comprises carbon pile resistor means.

Still another object is to provide generating system control means of the kind indicated above in which the generator is an alternator having alternating current terminals with which an external load circuit and the field circuit and regulator means are connected through rectifier means.

The invention can be further briefly summarized as consisting in certain novel combinations and arrangements of parts hereinafter described and particularly set out in the claims hereof.

In the accompanying sheet of drawings, forming a part of this specification:

Figure 1:
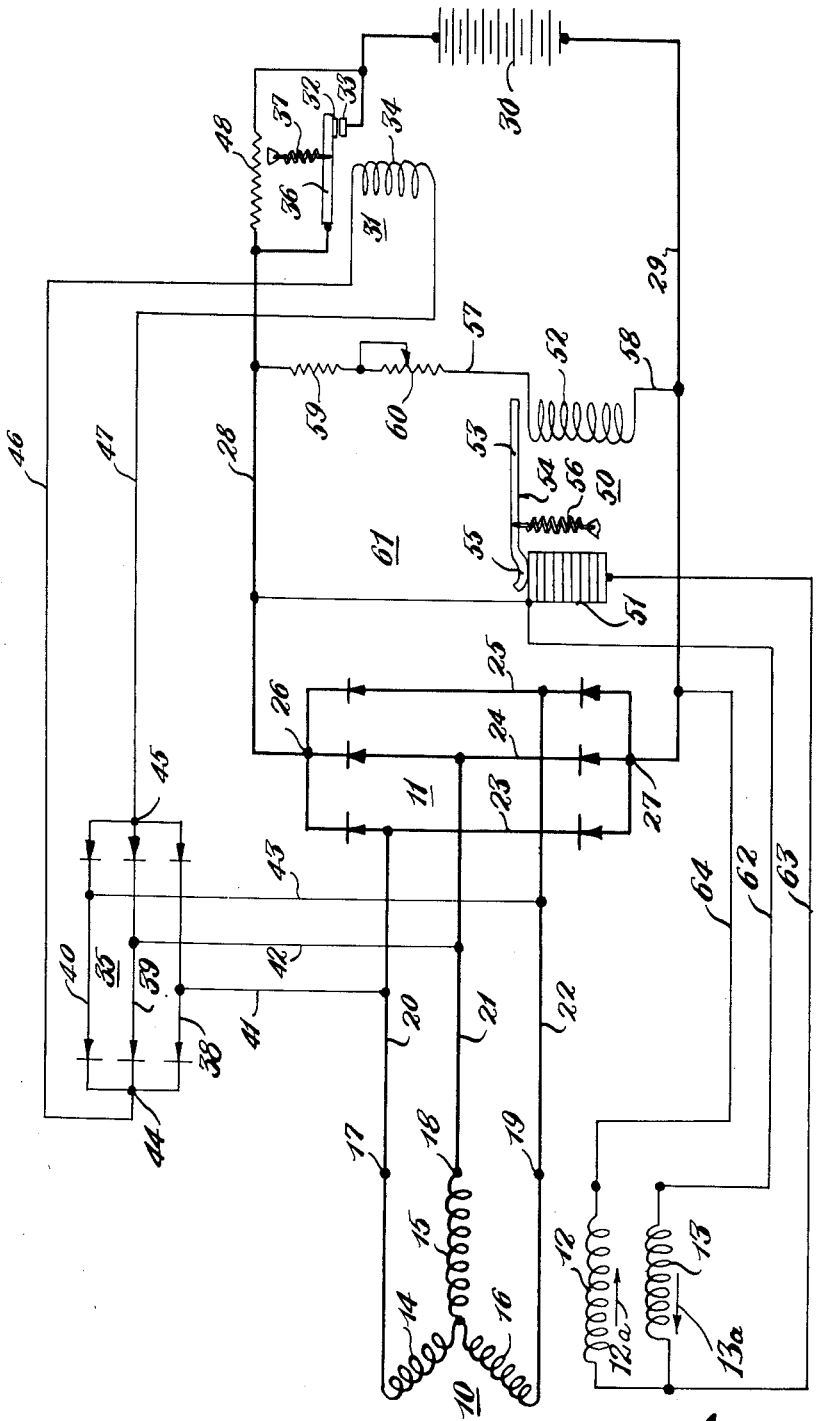
Fig. 1 is a wiring diagram illustrating an electrical generating system having the novel regulating means embodied therein and in which the generator is an alternating current generator.

Proceeding now with a more detailed description of the improved electrical system embodying the novel control means, reference will first be made to the form of the invention illustrated in Fig. 1 in which an alternator 10, such as an alternator driven by a variable speed vehicle driving motor, delivers current through a main rectifier 11 to an external direct current load circuit. The alternator 10 is shown, in this instance, as being a polyphase alternator having main and auxiliary field windings 12 and 13 and Y-connected inductor windings 14, 15 and 16. For a purpose to be explained hereinafter, the auxiliary field winding 13 is a bucking winding which magnetically opposes the main field winding 12, as is indicated in the drawing by the directional arrows 12ª and 13ª.

The alternator 10 is also shown as having alternating current terminals 17, 18 and 19 with which the rectifier 11 is connected by means of the conductors 20, 21 and 22. The alternator 10 could, of course, be a single-phase machine, if desired, or instead of being a three-phase alternator with Y-connected inductor windings, it could have delta-connected inductor windings.

The main rectifier 11 can be of the dry plate type and is here shown as being a three-phase full-wave bridge type of rectifier having three circuit arms 23, 24 and 25 with which the alternator terminals 17, 18 and 19 are connected, respectively, by the conductors 20, 21 and 22. The main rectifier 11 also has direct current terminals 26 and 27 with which the external load circuit is connected.

The external load circuit is here represented by a pair of load conductors 28 and 29 which are connected, respectively, with the direct current terminals 26 and 27 of the main rectifier 11 and with the terminals of a storage battery 30. The external load circuit also includes a conventional load relay 31 having cooperating series contacts 32 and 33. The load relay 31 also comprises an energizing coil 34 to which energizing current is supplied from the alternator 10 through the auxiliary rectifier 35. The contact 32 is a movable contact which is carried by an armature 36 and is urged toward its open position by a tension spring 37.

The auxiliary rectifier 35 is here shown as being a full-wave rectifier having circuit arms 38, 39 and 40 which are connected, respectively, with the alternator terminals 17, 18 and 19 by the conductors 41, 42 and 43. The auxiliary rectifier 35 has direct current terminals 44 and 45 with which the ends of the energizing coil 31 of the load relay are connected by the conductors 46 and 47. A resistor 48 is here shown as being connected across the contacts 32 and 33 of the load relay 31 for supplying a low energizing current to the alternator from the battery 30 for producing a quick build-up of the field excitation of the alternator during starting.

The terminal voltage of the alternator 10 is controlled by a voltage regulator 50 operating in conjunction with the bucking field winding 13. The voltage regulator 50 is here shown as being of the carbon pile type comprising a carbon pile resistor 51 and an energizing coil 52. The voltage regulator 50 also comprises an armature 53 which is movable on a fulcrum or pivot 54 and has a pressure-applying end 55 which normally applies pressure to the carbon pile 51 in response to the action of the tension spring 56 on the armature.

The energizing coil 52 is a voltage coil which is connected across the load conductors 28 and 29 by the circuit connections 57 and 58. The energizing circuit for the magnet coil 52 also includes a ballast resistance 59 and a variable resistance 60 which may be desirable in this circuit for adjusting or calibrating uses or other purposes.

The carbon pile 51 is located in the field circuit of the alternator and has one end thereof connected with the load conductor 28 by the conductor 61. This end of the carbon pile is also connected with one end of the bucking field 13 by the conductor 62. The other end of the carbon pile 51 is connected with one end of the main and bucking field coils 12 and 13 by the common conductor 63. The other end of the main field winding 12 is connected with the load conductor 29 by the conductor 64.

From the circuit connections just described above for the carbon pile 51 of the voltage regulator 50, it will be seen that the carbon pile is included in the energizing circuit for the main field winding 12 in series relation with this winding, such that variation in the resistance value of the carbon pile in response to changes in the energization of the magnet coil 52 will vary the field excitation produced by the main field winding. It will also be seen that the bucking field winding 13 is connected in shunt relation to the carbon pile 51 by the conductors 62 and 63, such that this bucking winding will be energized in accordance with the voltage drop across the carbon pile.

To explain the operational advantages of the bucking field winding 13 as here used in combination with the carbon pile voltage regulator 50, it is pointed out that at the present time, carbon pile voltage regulators being supplied for use on aircraft embody a carbon pile resistor having a minimum resistance of approximately one ohm and a maximum resistance of approximately 35 ohms. If a voltage regulator having a carbon pile resistor of these resistance values is used with a generator which requires a resistance of more than 35 ohms for controlling its field excitation, the regulator will operate under unsatisfactory and unstable conditions and will, accordingly, have a relatively short life. The provision of the bucking field winding 13 in association with a carbon pile voltage regulator as shown in Fig. 1, permits such a carbon pile voltage regulator to be used successfully with a generator which requires a greater resistance than the usual 35 ohms for controlling its field excitation.

Thus, when the generator 10 of Fig. 1 is operating under heavy load or at low speed, the voltage drop across the carbon pile resistor 51 will be relatively low and at this time the energization of the bucking field winding 13 will be such that it will have a very small or negligible effect on the output of the generator. On the other hand, when the speed of the generator is high and the load imposed thereon is low, the voltage drop across the carbon pile resistor 51 will be relatively high and the bucking winding 13 will then be strongly energized and will produce an effective control action on the generator. It will accordingly be seen that the provision of the bucking field winding 13 in this shunt relation to the current flow control means of a voltage regulator, will produce a very effective control action on the generator at the time that the maximum control action is needed. On the other hand, the bucking field winding 13 will not materially decrease the output of the generator at those times when the maximum output of the generator is needed or desired.

Figure 2:
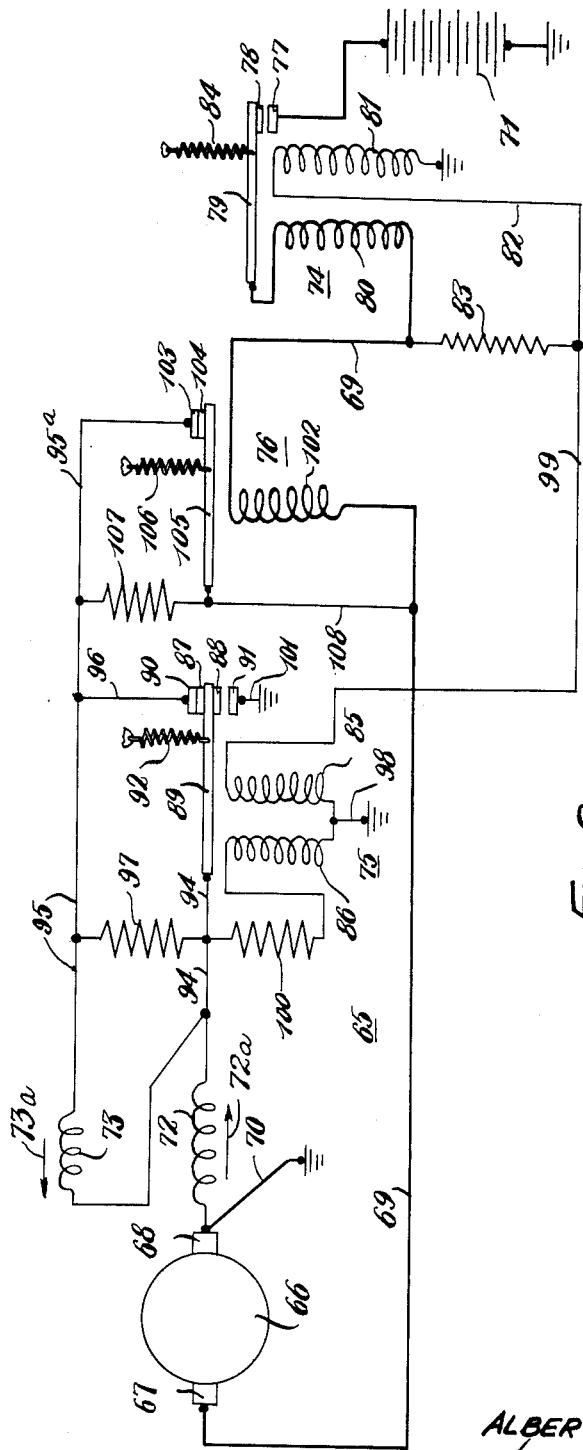
Fig. 2 is a wiring diagram showing a similar generating system, but in which the generator is a direct current generator and in which the current flow control means of the voltage regulator comprises a plurality of pairs of switch contacts.

Fig. 2 of the accompanying drawings shows another generating system 65 which employs this same principle of a bucking field winding in combination with the current flow control means of a voltage regulator. The generating system 65 is provided with a direct current generator 66 having brushes 67 and 68 with which a pair of load conductors 69 and 70 are connected, respectively. The load conductor 70 is a ground connection, but the load conductor 69 is connected with an external load, such as the storage battery 71. The generator 66 is provided with a main field winding 72 and an auxiliary field winding 73 which is in a bucking or magnetically opposed relation to the main field winding, as is represented by the directional arrows 72a and 73a. The generating system 65 also comprises a load relay 74, a vibratory voltage regulator 75 and a vibratory load limiter or current regulator 76.

The load relay 74 comprises series contacts 77 and 78, of which the contact 78 is a movable contact carried by an armature 79. The load relay 72 also comprises a series magnet coil 80 and an operating coil or voltage magnet coil 81. The coil 81 has one end thereof connected with ground and its other end connected with the load conductor 69 through the circuit connection 82 and the ballast resistance 83. The movable contact 78 is normally urged toward an open position by the action of the spring 84 on the armature 79.

The voltage regulator 75 comprises primary and secondary energizing coils 85 and 86 and pairs of cooperating switch contacts 87, 90 and 88, 91 of which the movable contacts 87 and 88 are carried by a vibratory armature 89 and cooperate, respectively, with the upper and lower stationary contacts 90 and 91. The movable contact 87 is normally urged toward a position of engagement with the upper stationary contact 91 by the action of a spring 92 on the armature 89.

The main field winding 72 of the generator 66 is a shunt winding having one end thereof connected with the brush 68 and its other end connected with the movable contacts 87 and 88 of the voltage regulator 75 through the armature 89 and the conductor 94. The bucking field winding 73 has one end thereof connected with the movable contacts 87 and 88 through the conductor 94 and the armature 89 and has its other end connected with the stationary contact 90 through the conductors 95 and 96. The voltage regulator 75 also includes a so-called point resistance 97 which is connected in shunt relation to the upper pair of voltage regulator contacts 87 and 90, such that when these contacts are closed, this point resistance will be short-circuited.

The bucking field winding 73 is thus connected in shunt relation to the point resistance 97, such that the bucking winding will be energized in accordance with the voltage drop across this point resistance. The relation of the bucking field winding 73 to the current flow control means of the voltage regulator 75, that is its relation to the point resistance 97 and the cooperating contacts 87 and 90, is the same relation as that which the bucking field winding 13 of Fig. 1 bears to the carbon pile resistor 51 of the voltage regulator 50 and accomplishes a similar control function.

The magnet coils 85 and 86 of the voltage regulator 75 are the same primary and secondary regulator windings which have been used heretofore in voltage regulators of this type. The coil 85 is a voltage coil having one end thereof connected with the generator brush 68 through the ground connection 70 and the common ground connection 98 and having its other end connected with the load conductor 69 through the circuit connection 99 and the resistance 83. The secondary coil 86 has one end thereof connected with the movable contact 87 of the voltage regulator 75 through the armature 89, the conductor 94 and the ballast resistance 100 and has its other end connected with the generator brush 68 through the ground conductors 98 and 70. The lower stationary contact 91 of the voltage regulator 75 is connected with the brush 68 through a ground connection 101 and through the ground connection 70.

The current regulator 76 comprises a series magnet coil 102 located in the load conductor 69, and a pair of stationary and movable switch contacts 103 and 104 of which the movable contact 104 is carried by a vibratory armature 105. A tension spring 106 acting on the armature normally urges the movable contact 104 toward engagement with the stationary contact 103. The current regulator 76 also comprises a point resistance 107 which is in shunt relation to the current regulator contacts 103 and 104 by having one end thereof connected with the stationary contact 103 by the conductor 95a. The movable contact 104 of the current regulator is connected with the load conductor 69 through the armature 105 and the circuit connection 108.

When the generator 66 of the electrical system 65 is operating at low speed or under relatively heavy load, the tendency of the voltage regulator 75 will be to cause closing of the contacts 87 and 90 to thereby short-circuit the field regulating resistance 97 out of the energizing circuit of the main field winding 72. Whenever the operating condition of the generator 66 is such that the voltage regulator contacts 87 and 90 are opened, the point resistance 97 will be inserted into the field circuit of the main field winding 72 in series relation thereto. Similarly, whenever the current regulator contacts 103 and 104 are opened, the point resistance 107 will be inserted into the field energizing circuit for the main field winding 72 in series relation to the latter.

From the above-described circuit connections for the bucking field winding 73, it will be seen that this winding is energized by the field circuit in accordance with the voltage drop across the point resistance 97 of the voltage regulator. When the generator 66 is operating under the above-mentioned low speed or high load condition and the point resistance 97 is short-circuited by the closing of the contacts 87 and 90, the bucking action of the winding 73 will be relatively weak because of the substantially negligible voltage drop across the point resistance 97 at this time and the bucking winding will then have substantially no effect on the output of the generator. However, when the generator 66 is operating at a relatively high speed or under a low load condition, the tendency of the voltage regulator 75 will be to cause opening of the contacts 87 and 90, whereupon the resulting strong excitation of the bucking field winding 73 will be very effective in controlling the terminal voltage of the generator.

When the operating condition of the generator 66 is such that the movable contact 88 of the voltage regulator 75 engages the lower stationary contact 91, the main field winding 72 will be substantially short-circuited and the field excitation produced by this winding will be relatively suddenly destroyed or collapsed. The field regulating action of the voltage regulator 75, with respect to its lower pair of contacts 88 and 91, is thus similar to the regulator action heretofore accomplished in double-contact voltage regulators of this type, but because of the presence of the bucking field winding 73 and the effective control function produced thereby and the lower voltage needed across the regulator contacts, there will be less tendency for the occurrence of an ionized condition of the air in the air gaps between the switch contacts of the voltage regulator and, hence, less likelihood of the occurrence of a stuck or welded condition of the voltage regulator contacts such as has frequently occurred heretofore in devices of this kind.

Figure 3:
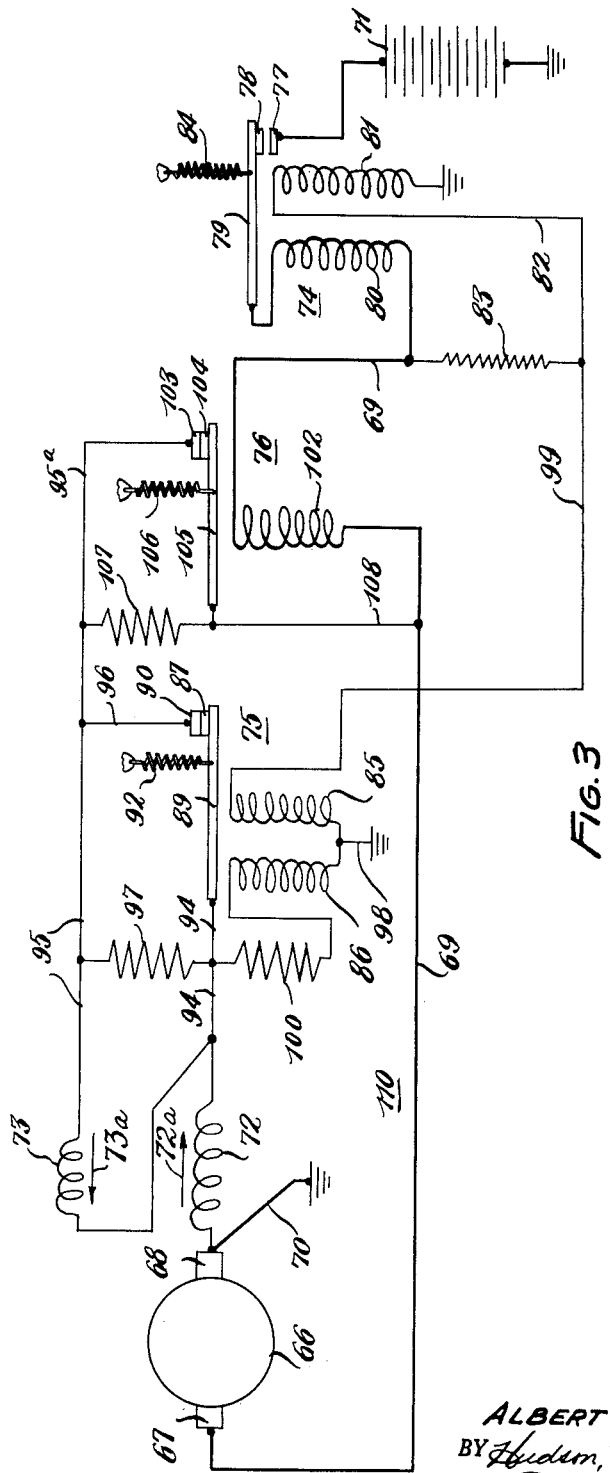
Fig. 3 is a wiring diagram similar to Fig. 2, but in which the voltage regulator has only one pair of switch contacts.

Fig. 3 of the drawings shows an electrical generating system 110 which is the same as the system 65 of Fig. 2 and functions in the same manner, with the exception that in the system of Fig. 3, the lower contact of the voltage regulator 75 and the circuit connection for such lower contact have been omitted.

From the accompanying drawings and the foregoing detailed description, it will now be readily understood that this invention provides improved electrical generating systems in which a bucking field winding used in association with the current flow control means of a regulating device, and particularly a voltage regulator, is highly effective in accomplishing a regulating action by which the terminal voltage of the generator can be maintained substantially constant. Likewise, it will now be seen that this bucking field winding and voltage regulator combination can be employed with an alternator which is connected with an external load circuit through a rectifier, or can be used with a direct current generator whose current output is being limited or controlled by a current regulator. Additionally, it will be seen that the bucking field winding is energized in accordance with the voltage drop across the current flow control means of the voltage regulator and, hence, the energization of the bucking winding will be substantially in accordance with the regulating needs of the generator and will have a substantially negligible effect on the output of the generator when maximum output of the generator is needed or is desirable.

Although the electrical generating systems and regulating means of the present invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an electrical system, a generator having terminals and a main field winding, a regulator having energizing coil means connected with the generator terminals and carbon pile means having a resistance value responsive to the energization of said coil means, a field circuit having said main field winding therein in series with and controlled by said carbon pile means, and a bucking field winding connected in said field circuit in shunt relation to said carbon pile means so as to be energized in accordance with the voltage drop across said carbon pile means.

2. In a vehicle electrical system, an alternator adapted to be driven at variable speeds, said alternator having alternating current terminals and a main field winding, a rectifier connected with said alternating current terminals and itself having direct current terminals, a load circuit connected with said direct current terminals, a voltage regulator comprising a voltage magnet coil connected across said direct current terminals and carbon pile resistance means whose resistance value is responsive to variation in the energization of said magnet coil, a field circuit having said main field winding therein in series with and controlled by said carbon pile resistance means, and a second field winding magnetically opposing said main field winding and connected in said field circuit in shunt relation to said carbon pile resistance means so as to be energized in accordance with the voltage drop across said carbon pile resistance means.

References Cited in the file of this patent

UNITED STATES PATENTS

| | | |
|---|---|---|
| 929,758 | Field | Aug. 3, 1909 |
| 1,641,386 | Hunt | Sept. 6, 1927 |
| 2,100,905 | Leece | Nov. 30, 1937 |
| 2,133,976 | Creveling | Oct. 25, 1938 |
| 2,233,772 | Creveling | Mar. 4, 1941 |
| 2,464,567 | Fisher | Mar. 15, 1949 |

FOREIGN PATENTS

| | | |
|---|---|---|
| 17,922 | Great Britain | Aug. 6, 1913 |
| 113,096 | Great Britain | Dec. 31, 1919 |